INVENTOR.
GEORGE E. STANTON
BY
ATTORNEY

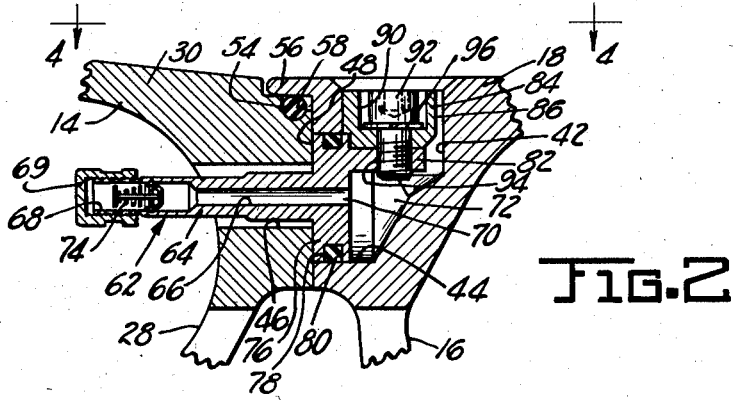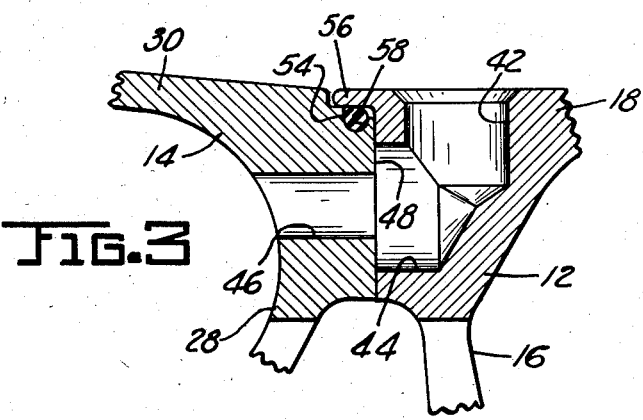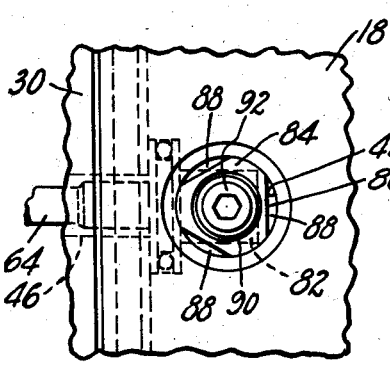

United States Patent Office 2,871,905
Patented Feb. 3, 1959

2,871,905

TIRE INFLATING VALVE FOR AIRCRAFT WHEEL

George E. Stanton, South Bend, Ind., assignor to Bendix Aviation Corporation, South Bend, Ind., a corporation of Delaware Application February 18, 1957, Serial No. 640,684

8 Claims. (Cl. 152—404)

This invention relates to a tire-inflating valve for an aircraft wheel which is designed for use with both a tube and a tubeless type tire, the valve being particularly constructed for inflating a tubeless type tire to be mounted on the wheel.

Most of the present day aircraft wheels are provided with tube type tires for the reason that their performance has been well established by a long period of use. In recent times, however, there has developed a recognition of the advantages of tubeless type tires and efforts have been made to equip aircraft wheels with this type tire since there is the advantage of a weight saving and also because there is a reduction in the likelihood of the tire to blow out.

Realizing the advantages of a tubeless type tire, the present invention proposes a wheel design which is capable of using a tube type tire, but is readily convertible to a tubeless tire arrangement, the requirement for this conversion being principally the provision for change in tire-inflating devices. To achieve this it is necessary to construct the wheel in such a manner that it will accommodate either of two distinctly different tire-inflating means with the net result that wheels which are now being manufactured are suitable for both the tube type tire and tubeless type tire.

Another object of the present invention is to obtain a tire-inflating valve which can be reliably held within the wheel so that it will not be dislodged by tire-inflation pressure, and which will be protected by the wheel structure so that it is not subject to buffeting or inadvertent knocking so as to develop leakage of air through the valve. It is a further feature of the invention that during inflation of the valve the necessary handling of the valve will not cause it to be moved in such a manner that it will impair efficiency of the seal around the valve assembly.

Other objects of the invention relate to the structural simplicity of the valve assembly such that it can be made as economically as possible. This is achieved, to a considerable extent, by virtue of the fact that the valve assembly is made principally as one entire piece composed of straight portions which can be machined, thus making an obvious process advantage.

Another feature of the valve assembly is that a portion of the valve serves as a sealing partition for a chamber in one of the wheel portions, and means are provided in conjunction with this partition to lock the valve against turning movement and lateral movement in one direction, while a shoulder on a portion of the other wheel half abuts the partition to prevent lateral movement of the valve assembly in the other direction.

It will be apparent from a description of the invention that the valve is located in the wheel in such a manner that the wheel can be assembled without interference or complication, owing to the presence of the valve.

Other objects and features of the invention will become apparent from a consideration of the following description which proceeds with reference to the accompanying drawings, wherein:

Figure 2 is an enlarged fragmentary section view of the valve shown in its operative position on the aircraft wheel;

Figure 3 is the same as Figure 2 but with the valve removed; and

Figure 4 is a top view of the valve looking in the direction indicated by the arrows 4—4 in Figure 2.

Figure 1:
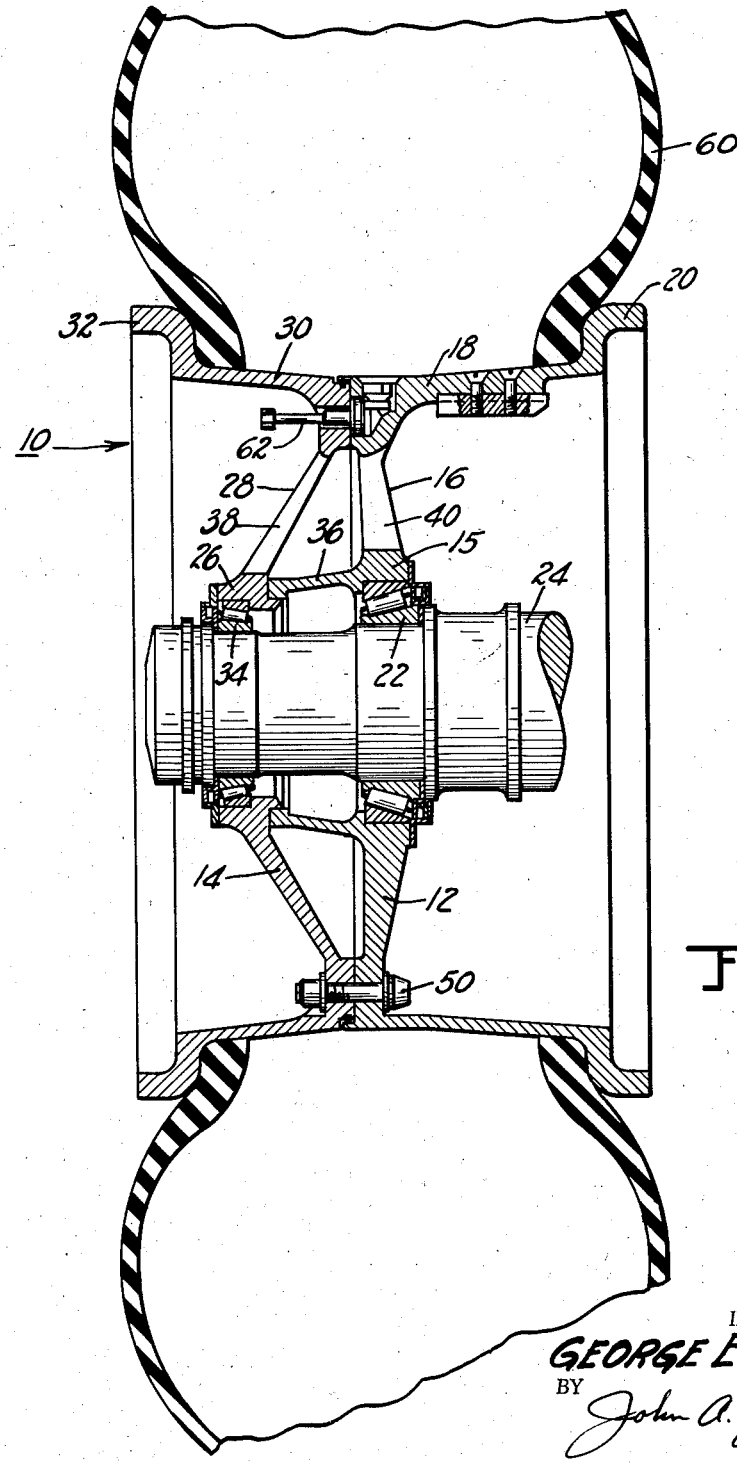
Figure 1 is a section view taken through a diameter of the wheel having the valve positioned therein.

The aircraft wheel, indicated generally by reference numeral 10, is made up of two wheel halves 12 and 14. The wheel half 12 comprises a hub 15, a disk wheel 16, rim 18 and tire-supporting flange 20. The hub 15 in wheel half 12 is supported on an anti-friction bearing 22 which is fitted onto axle 24.

The wheel half 14 is constructed approximately the same as wheel half 12, there being a hub 26, a disk wheel 28, rim 30 and flange 32. An anti-friction bearing 34 is provided at the hub 26 and is of smaller size than the bearing 22 since less weight is carried by this bearing. A cylindrical stiffening member 36 is formed at the hub 15 and extends into interlocking engagement with hub 26 to stiffen the wheel. A plurality of spaced ventilating openings 38 and 40 are formed in the disk wheels 16 and 28. The disk wheels are enlarged as they merge with the rims 18 and 30 to give strength to the wheel and also to be of a size accommodating the tire-inflating valve.

Two angularly intersecting bores 42 and 44 (Figure 3) are formed in wheel half 12. The opening 42 terminates at the rim 18 and extends to a depth sufficient to meet opening 44 which is formed in the enlarged portion of the disk wheel 16. Opening 46 in disk wheel 28 is smaller in size than opening 44 so that when the two wheel halves are joined together there is provided a shoulder 48 for retaining the valve assembly in position.

The two wheel halves 12 and 14 are joined together by means of a plurality of circumferentially spaced bolts 50 which are received through spaced, aligned openings in the disk wheels 16 and 28. A stepped circumferential groove 54 is formed at the inner edge of rim 30 and an overlying ledge 56 is provided on rim 18 to retain a large diameter sealing ring 58 at the location sometimes referred to as the "wheel split."

A tire 60 is provided in the "wheel well" which is the space defined between the flanges 20 and 32. Assuming that the tire is a tubeless type tire, it is inflated by means of valve assembly designated generally by reference numeral 62. The valve assembly consists of a valve core 64 having a longitudinal passage 66 with an inlet port 68 and outlet port 70 which opens into chamber 72 defined by the openings 42 and 44. A spring-loaded valve 74, which is located within the valve core 64, permits passage of air in an inflating direction only. An enlarged circular boss 76 is formed integrally with valve core 64 and is of such diameter that it fits snugly within opening 44. The boss serves as a closing partition for the chamber 72. A groove 78 in the outer periphery of the boss 76 receives a temperature resistant seal 80 which functions to prevent leakage of air across the partition or boss 76 from chamber 72. An extension 82 is formed integrally with the circular boss 76 and is projected forwardly so that it extends into the space provided by opening 42.

Locking member 84 is a circular member of approximately the same diameter as opening 42 and is fitted into the opening 42. The locking member is provided with flats 86 which provide gaps 88 between the locking member and the wall of opening 42 so that air is vented from chamber 72 across the locking member 84 and into the tire. The locking member has a counterbore opening 90 which receives a cap screw 92 that is threadedly received in opening 94 of projection 82. A lock washer 96 prevents turning of the cap screw once it is inserted in place.

All that is required to assemble the valve is to insert the circular boss 76 within opening 44, the locking member 84 is then dropped into opening 42 with the counterbore opening 90 of the locking member being aligned with the threaded opening 94 in projection 82. Machine screw 92 is then inserted to secure the locking member 84 and projection 82 together. The wheel half 14 is then coupled with wheel half 12 with the valve core being passed through opening 46 in the disk wheel 28. The shoulder 48 contacts the circular boss 76, thus preventing displacement of the valve assembly under the influence of the tire inflation pressure (which is present in chamber 72) tending to force the valve assembly toward the left.

To inflate the tire cap 69 is removed from the end of the valve core 64 and a pressure source is communicated with the port 68 at the end of valve core 64. The incoming inflating pressure displaces one-way valve 74 to pass into chamber 72 and then through the gaps 88 to the interior of the tire 60. While the tire is being inflated, there is unavoidable stress placed on the end of valve core 64 and it is important that this stress does not result in impairment of the seal between boss 76 and opening 44. This is accomplished since contact of the locking member 84 with the wall of opening 42 prevents tipping of the locking member to thereby resist vertical up and down movement of the port 68 of valve core 64. If the port end of the valve core 64 were permitted to move up and down then the resulting wobbling movement of boss 76 might impair the efficiency of seal 80.

The valve assembly is prevented from rotating since the locking member 84, which is affixed to the valve assembly, is held fast in opening 42. The valve assembly is prevented from moving toward the right by virtue of contact of the locking member 84 with the walls of opening 42, and movement in a leftward direction of the valve assembly is prevented first by virtue of contact of locking member 84 with the sides of opening 42 and also because of abutment of boss 76 with shoulder 48. The resistance to movement of the valve in a leftward direction must be adequate, since the tire-inflating pressure in chamber 72 tends to displace the valve assembly toward the left.

The valve may be made of brass and is nickel plated to prevent electrolytic corrosion of the wheel in the case of the wheel being a magnesium forging. The valve can, of course, be constructed as a casting and this would be its logical construction when it is desired to make the valve in large quantities.

When a tube type tire is used, the combination of openings 42, 44 and 46 will accommodate a conventional valve assembly which necessitates no change in wheel construction from that shown.

It will be apparent from the description of the invention that numerous modifications and revisions may be made without departing from the underlying disclosed principles. It is therefore intended that such variations and modifications as are reasonably expected from those skilled in the art and which contain the herein disclosed principles, will be included within the scope of the following claims.

I claim:

1. An aircraft wheel adapted for use with both a tube and a tubeless type tire, comprising a first wheel half with a rim portion, said rim portion having a radial opening terminating at the rim surface to provide an inflation port for the tire, and a laterally formed opening which terminates at the wheel disk and intersects said radial opening, a second wheel half which is coupled to said first wheel half, said second wheel half having an opening mating with the adjacent intersecting opening of the first wheel half and of smaller size relatively thereto to provide a retaining shoulder, a valve assembly having a valve stem received in said openings, said stem being constructed with an internal passage for conductance of air therethrough, a one-way valve in said stem normally permitting passage of air in a tire-inflating direction only, an enlarged boss on said stem received in the laterally extending opening of the first wheel half and having a surrounding sealing means which prevents leakage of air across said boss, an integral mounting projection which extends across the radial opening in the first wheel half, a locking member located in said radial opening and contacting with the sides of the radial opening to prevent rocking movement of said locking member, the sides of said locking member having flats which provide sufficient gap to allow air to move across said locking member and into a tire received on the rim of said wheel, and an annular sealing means which is positioned between lapped segments of the rim portions of said wheel halves.

2. An aircraft wheel which is adaptable for both a tube and a tubeless type tire and a valve assembly for inflating the tire combined with said wheel, said aircraft wheel being constructed in two parts with overlapping rim segments, an angular passage formed in the one wheel half which terminates both at the surface of the rim portion and at the side of the wheel half, the other of said wheel halves having a laterally extending opening which is matched with the angular passage but is of smaller size relatively thereto, a valve assembly supported in said angular passage, said valve assembly comprising a boss tightly fitted into one portion of said angular passage, an integral projection formed at the end of said boss, locking means received in the portion of said passage opening at the rim surface and secured to said projection, said locking means being lodged in the passage to prevent rocking movement thereof but also having irregular sides permitting fluid flow thereacross, and a valve stem of the valve assembly extending through the opening in said other wheel half which further provides a surrounding shoulder for retaining the valve assembly in operative position within said angular passage.

3. In an aircraft wheel having a tire mounted thereon, two wheel portions, one of said wheel portions having an angular passage opening at the rim surface and at the wheel side adjacent the other wheel portion, an opening in the other wheel portion which matches with the angular passage but is of smaller diameter so as to provide a retaining shoulder between said wheel halves, a valve assembly mounted in the angular passage and comprising a stem with a longitudinal bore formed therein, a stem boss having a sealing means combined therewith, said stem boss being received in the angular passage of the one wheel half and held by said retaining shoulder, an integral extension of said boss which is aligned with the angularly formed portion of said passage, locking means having irregularly formed sides received in the angular passage and contacting the walls thereof to prevent tipping movement of said locking means, and means securing said locking means to the projection of the stem boss so that the stem boss is held securely within the angular passage to form a chamber venting across the irregular sides of the locking means and into the tire, said stem extending through the opening in the other wheel half to provide an accessible inlet port usable for inflating the tire.

4. In a wheel assembly having two wheel halves, a valve assembly comprising a stem with a longitudinal bore therein, a one-way valve located within said stem to permit passage of air in one direction only, a boss at the end of said stem having sealing means preventing escape of fluid therearound, an extension formed on said boss to serve as an attachment means, a detachable locking member extending transversely from said extension, and removable fastening means for securing said locking member to said extension, said locking member and boss being receivable in angularly intersecting bores of one wheel half, the stem of said valve being fitted through an opening in another wheel half which provides a backing for the valve assembly at the boss thereof.

5. In a two-part wheel, an inflation valve assembly comprising a valve stem with a longitudinal passage and a one-way valve in said passage, a boss constructed transversely to said stem and integrally therewith at the end of the stem, sealing means associated with said boss to prevent passage of air across the boss, a chamber in the one wheel half which receives said boss and is sealed thereby, an outlet passage from said chamber which leads to the rim of the wheel half, a projection from said boss which extends therefrom to be in nonobstructive alignment with said outlet passage, a locking means with irregularly shaped sides which is received in said outlet passage, the irregular sides of said locking means preventing rocking and lateral movement of the locking means while permitting egress of air from the chamber through the gaps between the passage wall and the irregular sides, means for attaching said locking means to the projection, and a shoulder on one of the wheel portions which engages the boss of said valve assembly when the two wheel halves are assembled together to thereby prevent lateral movement of the valve assembly.

6. An aircraft wheel which is composed of two assemblable portions adapted to mount an inflatable tire thereon, and an inflating valve comprising a valve stem with a longitudinal air inlet passage, a one-way valve controlling the flow of air through said passage, a chamber formed in one wheel portion, a boss having sealing means at the periphery thereof, said boss being positioned in the chamber to prevent passage of air across said boss, a chamber outlet passage formed in said one wheel portion leading from the chamber to the wheel rim where air is vented into the tire, means projecting from said boss into alignment with said chamber outlet passage, removable locking means received in said outlet passage and constructed to permit movement of air across said removable locking means, said removable locking means having contact with the walls of said passage to prevent rocking motion of the removable locking means and inflating valve, fastening means which secure together said projecting means and removable locking means, and abutment means on the other wheel portion which engage said boss to retain the boss within said chamber, the stem of said valve extending through an opening in the other wheel portion to be accessible to a pressure source.

7. An aircraft wheel adapted for use with both a tube and a tubeless type tire, comprising a first wheel half with a rim portion, said rim portion having an opening terminating at the rim surface to provide an inflation port for the tire, and a laterally formed opening which terminates at the wheel disk, passage means joining said openings, a second wheel half which is coupled with said first wheel half, said second wheel half having an opening mating with the adjacent intersecting opening of the first wheel half and of smaller size relatively thereto to provide a retaining shoulder, a valve assembly having a valve stem received in said passage, said stem being constructed with an internal passage for conductance of air therethrough, a one-way valve in said stem normally permitting the passage of air in a tire-inflating direction only, means constructed in combination with said stem to be received in the laterally extending opening of the first wheel half and having a surrounding sealing means which prevents leakage of air thereacross, an integral mounting projection which extends across the opening of the first wheel half, a locking member located in said opening of the first wheel half and contacting with the sides thereof to prevent rocking movement of said locking member, said locking member being constructed to allow air to move thereacross and into a tire received on the rim of said wheel, and an annular sealing means which is positioned between lapped segments of the rim portions of said wheel halves.

8. In a wheel assembly having two wheel halves, a valve assembly comprising a stem with a longitudinal bore therein, a one way valve located within said stem to permit passage of air in one direction only, means constructed on said stem and having sealing means preventing escape of fluid therearound, an extension formed on said first mentioned means to serve as an attachment means, a detachable locking member extending transversely to said attachment means, and removable fastening means for securing said locking means to said attachment means, said locking member and first mentioned means being receivable in intersecting bores of said wheel halves, the stem of said valve being fitted through an opening in another wheel half which provides a backing for the valve assembly.

References Cited in the file of this patent
UNITED STATES PATENTS

| 2,048,442 | Frank | July 21, 1936 |

FOREIGN PATENTS

| 1,098,290 | France | Mar. 2, 1955 |